Figure 7:
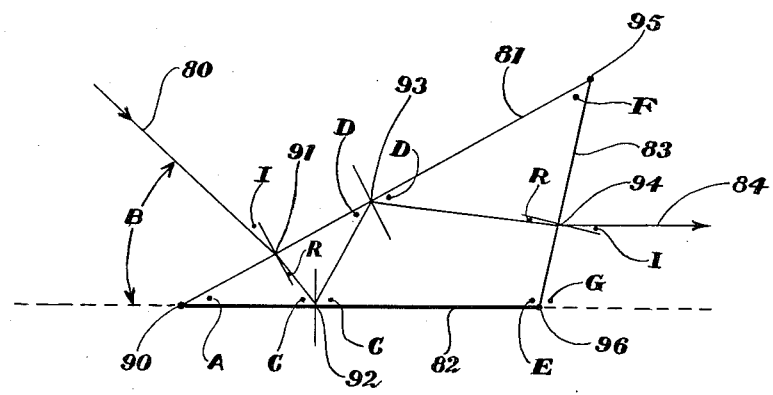

May 9, 1961    R. D. PICKERING    2,983,183
BEAM COMBINING PRISM
Filed Aug. 23, 1956    2 Sheets-Sheet 1
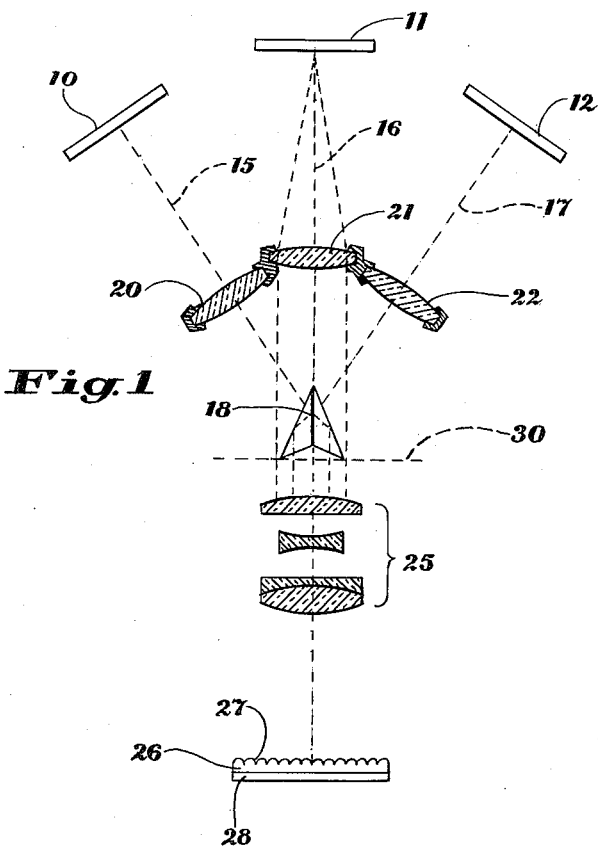
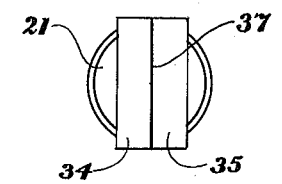
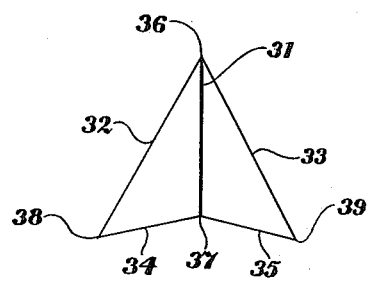
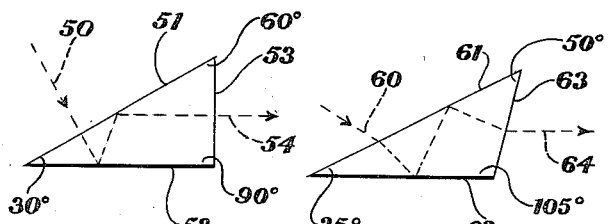
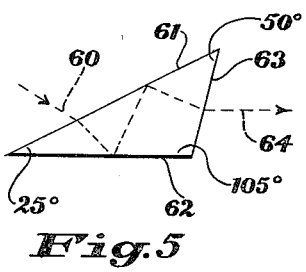
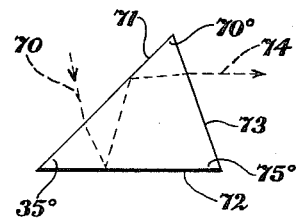
Royce D. Pickering
INVENTOR.
BY
ATTORNEYS United States Patent Office 2,983,183
Patented May 9, 1961

2,983,183
BEAM COMBINING PRISM
Royce D. Pickering, Rochester, N.Y., assignor to Eastman Kodak Company, Rochester, N.Y., a corporation of New Jersey
Filed Aug. 23, 1956, Ser. No. 605,839
3 Claims. (Cl. 88—1)

This invention relates to optical beam combiner prisms and particularly to an improved form of the beam combiner used in the television recording system described in pending application Serial No. 519,352, filed July 1, 1955, by Robert B. Smith and Charles H. Evans, now Patent No. 2,912,488.

The primary use of the present invention is in an optical system for recording three color separation images on lenticular film. However, it does not matter whether these color separation images are in the form of photographic negatives displayed by suitable illuminators or in the form of images on separate television tubes. The object of the present invention is to provide a beam combiner or more exactly a beam juxtaposer, which is precise and which is substantially insensitive so that slight movements thereof will not adversely affect the optical images formed by the system.

It is an object of the preferred embodiment of the invention to eliminate or at least minimize stray light and stray images.

The essential feature of the invention is an unusual beam combiner consisting of two constant-deviation prisms cemented together or otherwise held in contact with the interface metallized or otherwise arranged so as to be totally reflecting. In the preferred embodiment of the invention the entrance and exit faces of each prism are oriented so as to be not quite orthogonal to the light beam. Accordingly, stray light and stray images are directed to one side. When applied to recording on lenticular film, the exit faces of the prisms are located approximately in the plane which is conjugate to the emulsion with respect to the lenticules and the images forming objective of the system. The edges of the exit faces thus act to delineate the color zones sharply. Each of the constant-deviation prisms may be a 30–60–90° prism, the narrow face being the exit face and the hypotenuse being the entrance face of the system. In this case, however, the entrance and exit faces are orthogonal to the principal rays of the light beam and, accordingly, prisms which are slightly different from the 30–60–90° species are preferable. In general, dispersion at the exit face tends to correct any color introduced at the entrance face.

Other objects and advantages of the invention will be fully understood from the following description when read in connection with the accompanying drawing in which:

Fig. 1 is a schematic illustration of an optical system incorporating the invention;
Fig. 2 is a rear view of the beam combiner;
Fig. 3 is a top view of a beam combiner;
Figs. 4, 5 and 6 show various forms of constant-deviation prisms which may be used as one of the prisms in the beam combiner;
Fig. 7 is a diagram to illustrate the trigonometry of one of these constant-deviation prisms.

In Fig. 1 means for displaying color separation images are provided at 10, 11 and 12. These may be suitably illuminated color separation negatives or positives or they may be the faces of television tubes displaying the color separation images. The images are displayed orthogonal to three axes 15, 16 and 17 which are coplanar and converge in the point 18. Lenses 20, 21 and 22 are included so that the beam combiner located at the point 18 operates in collimated lights, but these lenses are not an essential part of the present invention. In fact, the precision of the present beam combiner makes the use of collimator lenses 20, 21 and 22 superfluous. Details of the beam combiner are given below. Essentially it acts to combine or juxtapose light from the display means 10 and 12 and to direct the respective beams parallel to the beam from the display means 11. The latter beam passes on both sides of the beam combiner. Strictly speaking the three beams are juxtaposed at this stage rather than combined and hence it might be more accurate to refer to the double prism system as a beam juxtaposer. In common parlance, however, the device is considered to be a beam combiner and hence this term is here used. In fact, the beams start to overlap as they leave the exit faces and eventually are fully combined as they reach the lenticules where they are once again separated. Thus the prism system does eventually combine the beams and hence may be properly termed a beam combiner.

The three beams when thus juxtaposed or combined are focused by an objective 25 on a film 26, the front surface 27 of which is lenticulated and the rear surface 28 of which is a photographic emulsion sensitive to the light from the three display means. Thus the images of the display means 10, 11 and 12 are focused on the film 26. However, each lenticule acts to divide the images at the emulsion 28. As is well known in lenticular photography, there is a plate 30 conjugated to the emulsion 28 with respect to the lenticules 27 (and the objective 25 to the extent the latter cooperates with the lenticules 27). That is, the objective 25 and lenticules 27 focus the plane 30 on the emulsion 28 at the same time that the objective 25 alone focuses the overall images on the film in general.

In order to have the separation images sharply delineated on the emulsion 28 behind each lenticule it is necessary to have the beams precisely divided in the plane 30. According to the invention the exit faces of the beam combiner prisms lie approximately in this plane 30 and hence the edges of the exit faces act to define the beams sharply at this point.

Fig. 2 shows the beam combiner as seen from objective 25 and Fig. 3 shows a top view thereof. The surface 31 is metallized to be totally internally reflecting. The surfaces 32 and 33 are the entrance faces respectively for the beams from display means 10 and 12. Surfaces 34 and 35 are the corresponding exit faces. The edge 36 at one end of the interface is pointed toward the center display means 11. The edge 37 at the other end of the interface acts as the dividing line approximately in the plane 30, between the two combined beams. The outer edges 38 and 39, also approximately in the plane 30, act to define the border between the combined beams and the direct beam from the display means 11.

As shown in Fig. 4 each of the two prisms may be a 30–60–90° prism. In this case the incident light 50 strikes the entrance face 51 orthogonally and is reflected from the interface 52 at 60° thereto. It is then reflected at the face 51 to pass through the exit face 53 orthogonally. The exit ray 54 is parallel to the interface 52 as required.

Fig. 5 illustrates the species of the invention in which the first angle of the prism is slightly less than 30°, namely 25° in this case. The entrance ray 60 comes in at 50° to the interface 62 and is refracted slightly at the entrance face 61. After reflection at the interface 62 and the surface 61 the ray emerges at 64 parallel to the interface 62 but refracted slightly at the exit face 63. This refraction or at least the dispersion associated therewith compensates (to the first order) for the dispersion in the entrance face. As explained in connection with Fig. 7, this prism is a 25–50–105° prism.

Fig. 6 illustrates a species in which the first angle is slightly greater than 30°, namely 35°. The incident ray 70 arrives at an angle of 70° to the interface 72, is refracted slightly at the surface 71, reflected at the surfaces 72 and 71 and emerges as shown at 74 parallel to the interface 72. Again refraction and dispersion at the exit surface 73 compensate for the refraction and dispersion at the entrance face 71. This prism is a 35–70–75° prism.

Fig. 7 is included to aid in explaining the trigonometry of the constant-deviation prism. The prism having angles A, E and F represents the general case. According to the present invention the angle A should be between 20° and 40°. The incident ray 80 arriving at the angle B to the interface 82 strikes the entrance face 81 in an angle of incidence I and is refracted, the angle of refraction being R. The requirements of the system are that the emergent ray 84 shall be parallel to the interface 82 and shall suffer at the exit face 83 a refraction equal and opposite to that suffered at the entrance face 81. In the simple case illustrated in Fig. 4, the angles I and R are both zero since the principal rays are orthogonal to the entrance or exit faces. In all other cases I and R have finite but small values.

The triangle 90—91—92 contains angles A, C and $R+90°$. Accordingly, $A+C+R=90°$.

Similarly, from the triangle 93—94—95 it is seen that the angle $D+F+R=90°$. Hence $A+C=D+F$.

From the triangle 90—92—93 it is seen that the angle C equals $A+D$. Hence $2A=F$.

From the triangle 90—96—95, it is seen that the angle G (which equals $180°-E$) equals $A+F$. Hence $G=3A$.

From the above equations it is noted that the angle $$G=3A$$
$$F=2A \text{ and of course}$$
$$A=A$$

Angle B between ray 80 and surface 82 can similarly be determined.

$B+A+I=90°$ as seen at the point 91 (extending the ray 80 until it strikes surface 82 forms a triangle in which the exterior angle is $90°-I$ and the remote interior angles are $A+B$). Also $E=90°+I$ as seen at the point 94 (ray 84 and surface 82 are parallel). Hence $$B+A+E=180°$$
$$B+A=180°-E$$
$$B+A=G$$
$$B=G-A$$
$$=3A-A$$
$$=2A$$

Since the angle A must be between 20° and 40°, the angle B must be between 40° and 80°.

Defining all of the angles in terms of the angle B, it is noted that $$A=½B$$
$$E=180°-\tfrac{3}{2}B \text{ and}$$
$$F=B$$

These relationships hold whether there is refraction as in the species shown in Figs. 5 and 6 or whether the principal rays are orthogonal to the entrance and exit faces as shown in Fig. 4, since the angles I and R cancel out in the equations.

Similar relationships also hold to describe the behavior of rays which emerge other than parallel to the interface of the prisms and the optic axis of the lens 25 and which will therefore be imaged at points other than the center of the field.

The form of the prism shown in Fig. 5 provides certain useful advantages in that rays corresponding to 84 in Fig. 7 which are more or less parallel to the axis within certain limits and which pass through face 83 near the corner 96 will not intersect the face 82 within the prism. This condition permits the entire area of face 83 to function as useful aperture over a limited field of view. The limits of the field of view for this condition depend upon the exact values of the prism angles and the refractive index of the glass used in the prism. The embodiment using two prisms of the type shown in Fig. 5 thus has two advantages (fairly wide field and full aperture).

I claim:

1. An optical system comprising symmetrically arranged means for displaying three color separation images orthogonal to mutually converging coplanar axes, the two outer axes forming equal acute angles with the center one with each angle equal to 50°, a beam combiner at the point of convergence of the axes comprising two substantially identical transparent prisms in contact, with a reflecting interface on the center axis and at right angles to the mutual plane of the three axes, said interface being totally reflective on both of its sides, said combiner being small enough to allow a light beam from the center display means, to pass on both sides of the combiner, each prism having at the edge facing the center display means a prism angle 25° and at the other edge adjacent to the interface a prism angle 105°.

2. An optical system for focusing three color separation images onto lenticular film comprising means for supporting the film with the lenticular side to the front, an objective focused on the plane of the film when so supported and located between the film and the plane conjugate to the emulsion side of the film with respect to the lenticules and objective, means for displaying three color separation images orthogonal to mutually converging coplanar axes, the center axis being coaxial with the objective and the two outer axes forming equal acute angles with the center one with each angle equal to 50°, the point of convergence of the axes being immediately in front of said conjugate plane, a beam combiner at said point of convergence consisting of two substantially identical transparent prisms in contact, with reflecting interface on the objective axis perpendicular to the mutual plane of the three axes, said interface being totally internally reflecting on both of its sides, said combiner being small enough to allow a light beam from the center display means to pass on both sides of the combiner to the lens, each prism having at the edge facing the center display means a prism angle 25° and at the other edge adjacent to the interface a prism angle 105°, the prism faces nearest the objective lying approximately in said conjugate plane.

3. An optical device for juxtaposing parallel to each other two light beams converging on the device at an angle of approximately 100°, comprising two substantially identical transparent prisms symmetrically in surface contact, with the interface totally reflecting on both of its sides and located to bisect the angle of vergence of the two beams, each prism having prism angles at the edges of the interface equal to A and $180°-3A$ where A is approximately 25°.

References Cited in the file of this patent

UNITED STATES PATENTS

| | | |
|---|---|---|
| 2,317,988 | Forssberg | May 4, 1943 |
| 2,389,646 | Sleeper | Nov. 27, 1945 |
| 2,465,652 | Legler | Mar. 29, 1949 |
| 2,600,590 | Thomas | June 17, 1952 |